United States Patent [19]

Browne et al.

[11] Patent Number: 4,565,053
[45] Date of Patent: Jan. 21, 1986

[54] PASTRY PROCESSOR TO DIVIDE PASTRIES AND INSERT SEPARATORS

[75] Inventors: Ronald O. Browne, 2420 Calle Galacia, Santa Barbara, Calif. 93103; William E. Hertzberg, Santa Barbara, Calif.

[73] Assignee: Ronald O. Browne, Santa Barbara, Calif.

[21] Appl. No.: 594,695

[22] Filed: Mar. 29, 1984

[51] Int. Cl.⁴ .............................................. B65B 63/00
[52] U.S. Cl. ........................................ 53/516; 53/157; 83/411 R; 83/530; 83/733
[58] Field of Search ............... 83/31, 266, 267, 530, 83/547, 733, 859, DIG. 1, 411 R; 30/114; 53/157, 435, 516, 519

[56] References Cited

U.S. PATENT DOCUMENTS

| 800,979 | 10/1905 | Bryan et al. | 83/733 |
| 2,023,122 | 12/1935 | Chandler | 53/519 |
| 2,116,845 | 5/1938 | Peck | 53/519 |
| 2,766,824 | 10/1956 | Sturtzer | 83/530 |
| 3,026,657 | 3/1962 | Williams et al. | 53/519 X |
| 3,147,695 | 9/1964 | Hyman | 83/530 X |
| 3,592,095 | 7/1971 | Passa et al. | 83/267 |
| 4,299,148 | 11/1981 | Meier | 53/516 X |
| 4,448,119 | 5/1984 | Williamson | 83/530 X |

FOREIGN PATENT DOCUMENTS

| 1266861 | 1/1963 | Fed. Rep. of Germany | 83/DIG. 1 |
| 2252738 | 6/1975 | France | 83/DIG. 1 |

Primary Examiner—Fred Silverberg
Attorney, Agent, or Firm—Donald D. Mon

[57] ABSTRACT

A machine to divide pastry into portions, leaving a separator at each separation. A turntable supports the pastry, and a blade descends to drive the separator into the pastry. The turntable is rotated incrementally, and the blade's stroke and initial height are adjustable to accommodate pastries of various heights.

15 Claims, 7 Drawing Figures

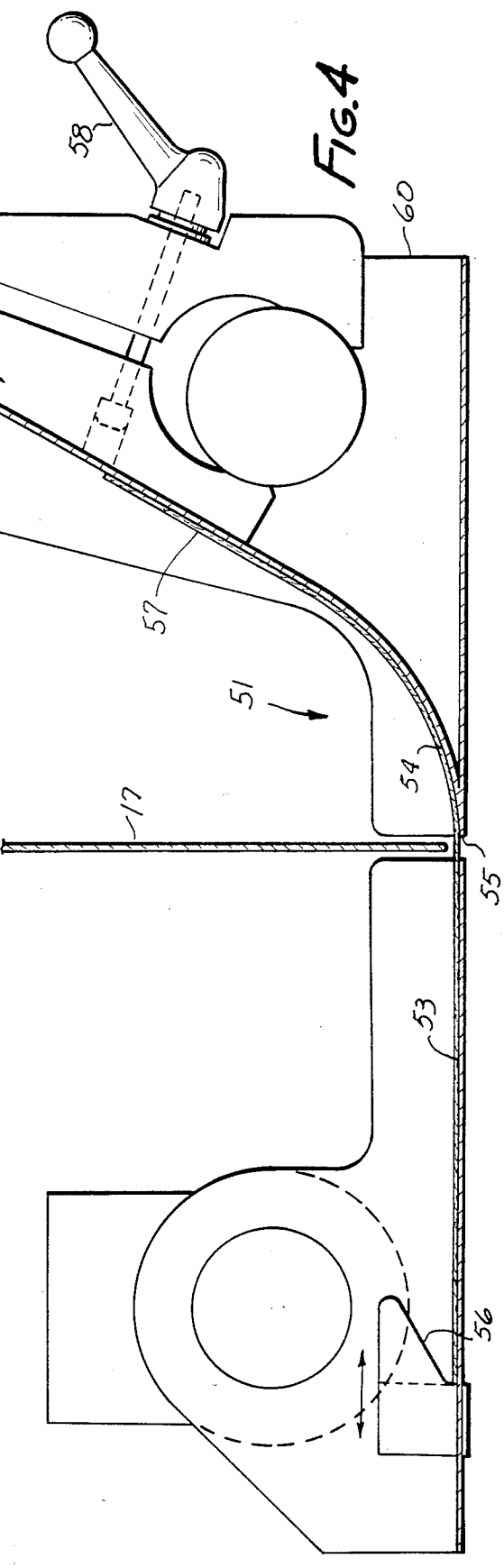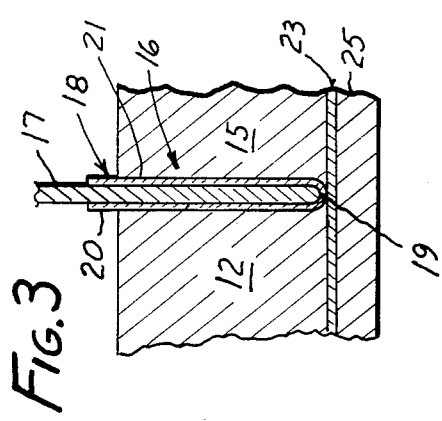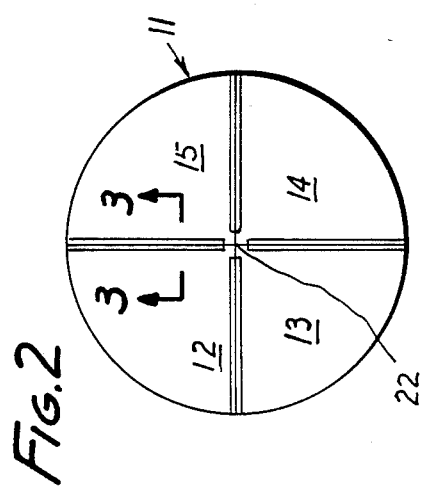

PASTRY PROCESSOR TO DIVIDE PASTRIES AND INSERT SEPARATORS

FIELD OF INVENTION

This invention relates to the processing of pastries by dividing them into accurately proportioned pieces, and separating the pieces with a separator such as a piece of coated paper.

BACKGROUND OF THE INVENTION

A familiar sight in restaurants is a server attempting accurately to cut a cake or pie and get the pieces out of the pan or off of the plate in a unitary and appealing condition. Especially for the first piece, the attempt is usually far from successful and often ends up as part of a server's meal. As a consequence, fewer than optimum slices are frequently produced, because of damage or because of inaccurate proportioning of the slices.

Such wastage is never to be encouraged, and some efforts have been made to overcome the difficulties. The most common expedient is a template applied over the pastry which is used as a guide for the knife. This is slow manual labor, and still leaves the pieces unseparated even though they have been cut apart.

There has been an effort, exemplified by Meier U.S. Pat. No. 4,299,148, to insert a separator between each pair of adjacent pieces, utilizing a template as a guide for a knife which drives the separator into the pastry. In this device the user manually inserts the separators with as many individual manipulations as there are to be pieces. This is a slow, inefficient device and technique, which requires many inefficient movements, each of which can involve the risk of error or spoilage.

It is an object of this invention to provide a processor to divide pastries and to insert separators between adjacent pieces in an accurate and expeditious way. Manipulations can be reduced by half, and the processor can be constructed in a way that it can readily be cleaned and maintained to food handling standards.

The term "pastries" is used generically to encompass all types of edibles that are to be divided into wedge-shaped portions. Examples are pies and cakes, and also the more exotic desserts such as mousse pies and the like. The costliness of some of these products is such that restaurants and bakeries can no longer afford the wastage which is so frequently attractive to the servers.

BRIEF DESCRIPTION OF THE INVENTION

A pastry processor according to this invention has a base frame and a turntable mounted to the frame. A head column is mounted to the frame, and a vertical blade track is formed on it. A blade carrier carrying a blade is reciprocally mounted to the track so the blade is moveable up and down relative to the turntable (and thereby to a pastry on the turntable). A support above the turntable has a support surface on each side of a slot. A separator can rest on these surfaces, bridging the slot. When the blade's edge passes through the slot, it folds and carries with it the separator, driving it into the pastry while it divides the pastry.

Indexing means steps the turntable an appropriate increment after each removal of the blade, and cycling means can be provided as appropriate and desired to automate the processor.

Sensing means senses the approach of the blade edge to the turntable to reverse the blade when the separation is concluded.

According to preferred but optional features of the invention, the head column is vertically moveable to adjust the height of the support and of the blade relative to the turntable; the turntable can be slidably mounted so as more readily to be loaded and unloaded; and the sensing means is a depending member whose contact with structure associated with the turntable causes reversal of the blade's movement.

According to yet other preferred but optional features of the invention, a pair of support members is provided so that two separators can be inserted at one time, one on each side of the central axis, and the supplies and separators can similarly be doubled.

The above and other features of this invention will be fully understood from the following detailed description and the accompanying drawings, in which:

BRIEF DESCRIPTION OF THE DRAWINGS

FIG. 2 is a top view of a circular pastry divided by the processor of this invention;

FIG. 3 is an enlarged fragmentary cross-section taken at line 3—3 in FIG. 2;

FIG. 4 is a side view showing a portion of the invention;

FIG. 5 is a cutaway view of a portion of the pedestal of this invention;

FIG. 6 is an enlarged section of a portion of FIG. 5; and

FIG. 7 is a fragmentary section taken at line 7—7 in FIG. 5.

DETAILED DESCRIPTION OF THE INVENTION

Figure 1:
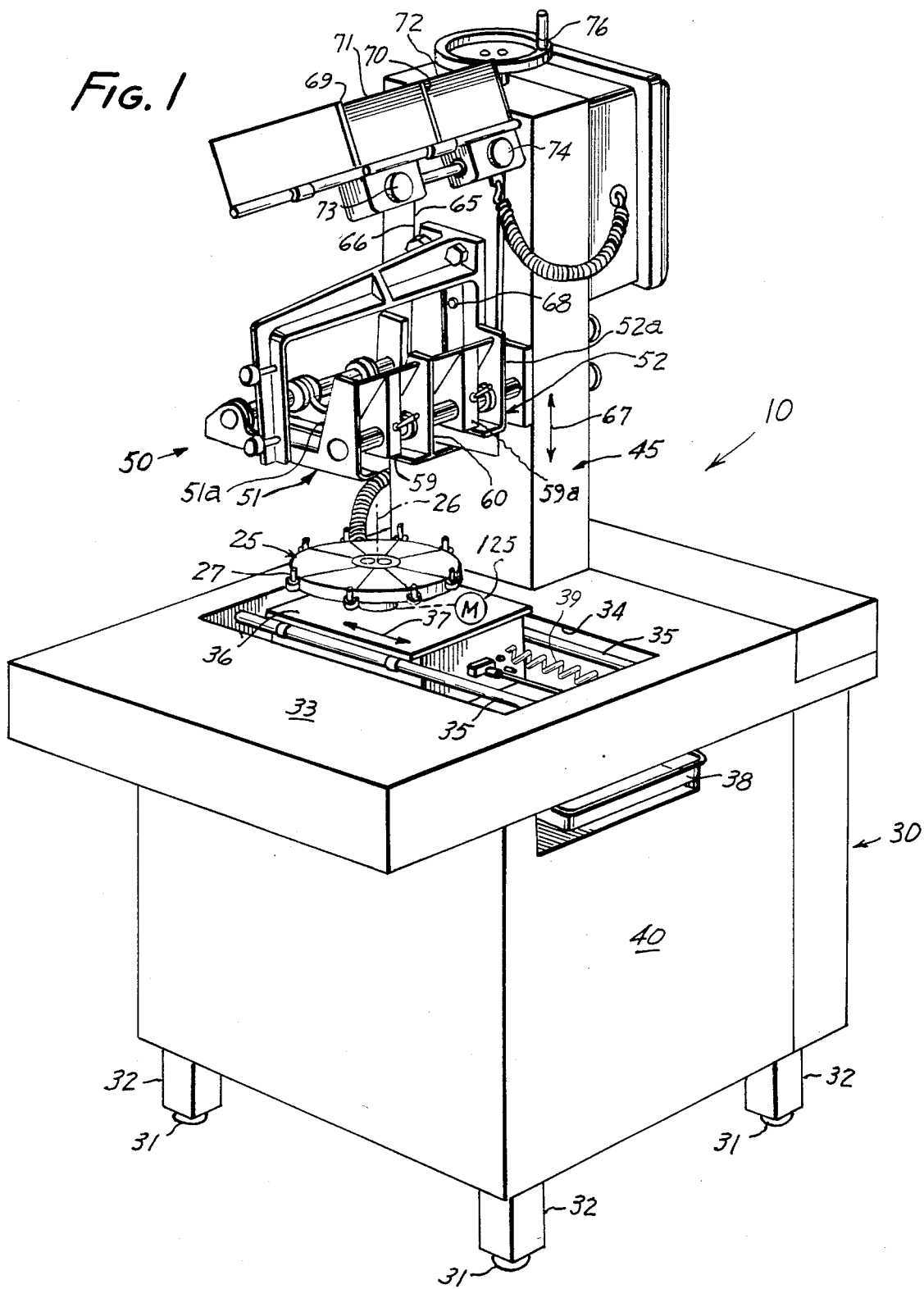
FIG. 1 is a perspective view showing the presently preferred embodiment of the invention.

In FIG. 1 there is shown a pastry processor 10 whose function it is to divide a circular pastry in the manner shown in FIGS. 2 and 3. In FIG. 2 there is shown a circular pastry 11 divided into four portions 12, 13, 14, 15. There can of course be fewer or more portions, and it is an advantage of this device that it can optionally be adjusted to divide the pastry into any desired number of pieces. The objective is to separate the pieces by forming a separation (gap) between each of them.

In FIG. 4 because they are all alike, only separation 16 between portions 12 and 15 will be described in detail. A blade 17 is shown which has driven a separator 18 between the portions while it divided them. To this action, a separator will be folded over the edge 19 of the blade so as to have two fold sides 20, 21 which cover the sides of the blade.

The paper is treated so as not to adhere strongly to either the blade or to the pastry. It may be a wax impregnated or plastic coated paper, for example. The fold sides should be tall enough to rise above the pastry, because otherwise the blade will become soiled, and after awhile will not make clean cuts. Also, the separator protects the sometimes sticky sides of the portions from each other.

It is an advantage of this construction that the blade remains clean except for a small region at the very center of the pastry where separators will have been brought as close together as possible. Therefore the resulting product will be a pastry accurately divided into a plurality of portions with each adjacent pair of portions separated by a separator from which the portions can readily be removed, and from which portions of the exposed separators can also be readily removed. As a consequence, pastries can be processed either at individual restaurants or more usually at a central processing plant where the baking has taken place. The product should be frozen to a soft frozen consistency so as more easily to be divided by this technique without undue distortion by crushing or the like. The blade will ordinarily be made as thin as possible, with a slightly rounded edge so it will not cut the separator. The separator itself is only thick enough that it is sufficiently rigid to make the cut and will not cut the separator. About 0.010 inches thick is a suitable dimension for the blade.

FIG. 3 illustrates a pan 23 or base beneath and supporting the pastry. This pan or base is rested on turntable 25. Turntable 25 is also shown in FIG. 1. It has a vertical central axis of rotation 26 with which the center of the pastry will be coincident while the pastry is being divided. A plurality of fingers 27 which are softly flexible will be provided to assist in centering the article, and will generally be brought to bear against the pan or base beneath the pastry article so as to keep it centered without damaging it.

The processor itself has a base frame 30 mounted on feet 31, at least one of which will customarily be equipped with a leveller such as a screw that is threaded upwardly into a respective one of legs 32. The frame includes a top 33 with a recess 34. Slide rails 35 in the recess receive a carriage 36 to which the turntable is rotatably mounted. The carriage is axially slideable along the rails as shown by arrow 37 along a horizontal axis. A crumb tray 38 is placed in the bottom of the recess. It can be removed through an opening in the side of the frame.

The carriage is shown in a first carriage position wherein the central axis 26 of the turntable is aligned with and is coincident with plane of blade 17. It is conveniently maintained in this position by a spring catch (not shown) which upon release will enable a bias spring 39 (not shown) to move the carriage to the right to a second position in FIG. 1 so that the turntable will be more accessible to an operator standing at the right hand face 40 of the processor. This enables convenient loading and unloading of the pastry. The carriage will simply be pushed manually against a spring-load resistance to the illustrated first position and retained there by a catch until released upon completion of the cycle. Then the spring load will return the carriage to the second position nearer to the operator.

A head column 45 is mounted to the frame. It rises above the frame. If the processor is adapted to work on only one thickness (height) of pastry, then vertical adjustments will be unnecessary. The length of the separator divided by two will be the approximate height of its free edges above the base of the cake. There should not be an excessive height of separator above the top of the pastry. For a one inch cake, for example, it is not suitable for there to be two or three inches of loose separator material above the cake surface, because it spoils the appearance. Therefore if the device is to be made adaptable to dividing pastries of various thicknesses, it must be adaptable to insert appropriate various sizes of separator material. For this purpose, the head column will be made vertically moveable, as will later be described.

To the head column there is fixedly mounted a support 50 which, when two separators are being inserted at one time will include two support elements 51,52. Because both of these elements are identical, only element 51 will be described. It is best shown in FIG. 4. It has a pair of support surfaces 53, 54, one on each side of a slot 55, which slot passes the blade. At the end of support surface 53 there is a stop 56 which is adjustably moveable to be abutted by a separator 57 laid atop the two support surfaces and bridging the slot. Surface 54 curves upwardly so that the tendency of the separator will be to slide against stop 56. Adjusting the position of stop 56 accommodates various lengths of separators, so that separators of different heights when placed in the pastry can be handled. Members 51a and 52a are slidable relative to central part 60 to accommodate separators of different widths so as to fit in pastries of various diameters. Clamps such as clamp 58 provide for these adjustments.

It will now be seen that the separator will be placed upon the support surfaces and then the blade will be driven through the slot, so as to engage the separator, and fold it in two with its sides against the blade. The bottom of the support should not be so far from the top of the pastry that the separator material can get loose and drag along the top while it is inserted in the pastry. The edges of the slot will hold the separator material reasonably close to the blade until this risk is over, meaning that clearance above the pastry should not ordinarily exceed about ½ to ¼ inch.

The head column carries a blade track 65 (FIG. 5) to which there is mounted a blade carriage 66 for up and down movement as shown by arrow 67. It is this reciprocation that causes the dividing of the pastry and the insertion of the separator. Obviously it is neither necessary nor particularly desirable for the stroke of the blade to be any longer than necessary, and its lower edge rises above the support surfaces only far enough that the separator can conveniently be set into it, and then the edge is lowered until it is just about in contact with the base which supports the base of the pastry being divided. When the bottom of the support is brought as close to the top of the pastry as practicable, then the stroke need be no more than the height of the pastry plus about one inch. The blade itself is held by a holder 68 in the blade carriage. The blade is not shown in FIG. 1, in order to simplify the drawings.

Above the blade there is disposed a pair of storage bins 69, 70 in which stacks of separators 71, 72 are held. The operator will take one in each hand and place one in each support element when two separators are inserted. Should only one-half of a diametral cut be desired, then a shorter blade will be used, and only one separator. This machine is adaptable for that purpose as well.

Above and well away from the blade are placed two actuator switches 73, 74. These switches will be connected in series so that the operator must close both of them at the same time in order to start the sequence. They are far enough away from each other that they cannot be actuated by only one hand. Thus automatic sequence will be started when only the two switches are simultaneously closed.

Figures 5, 6, 7:
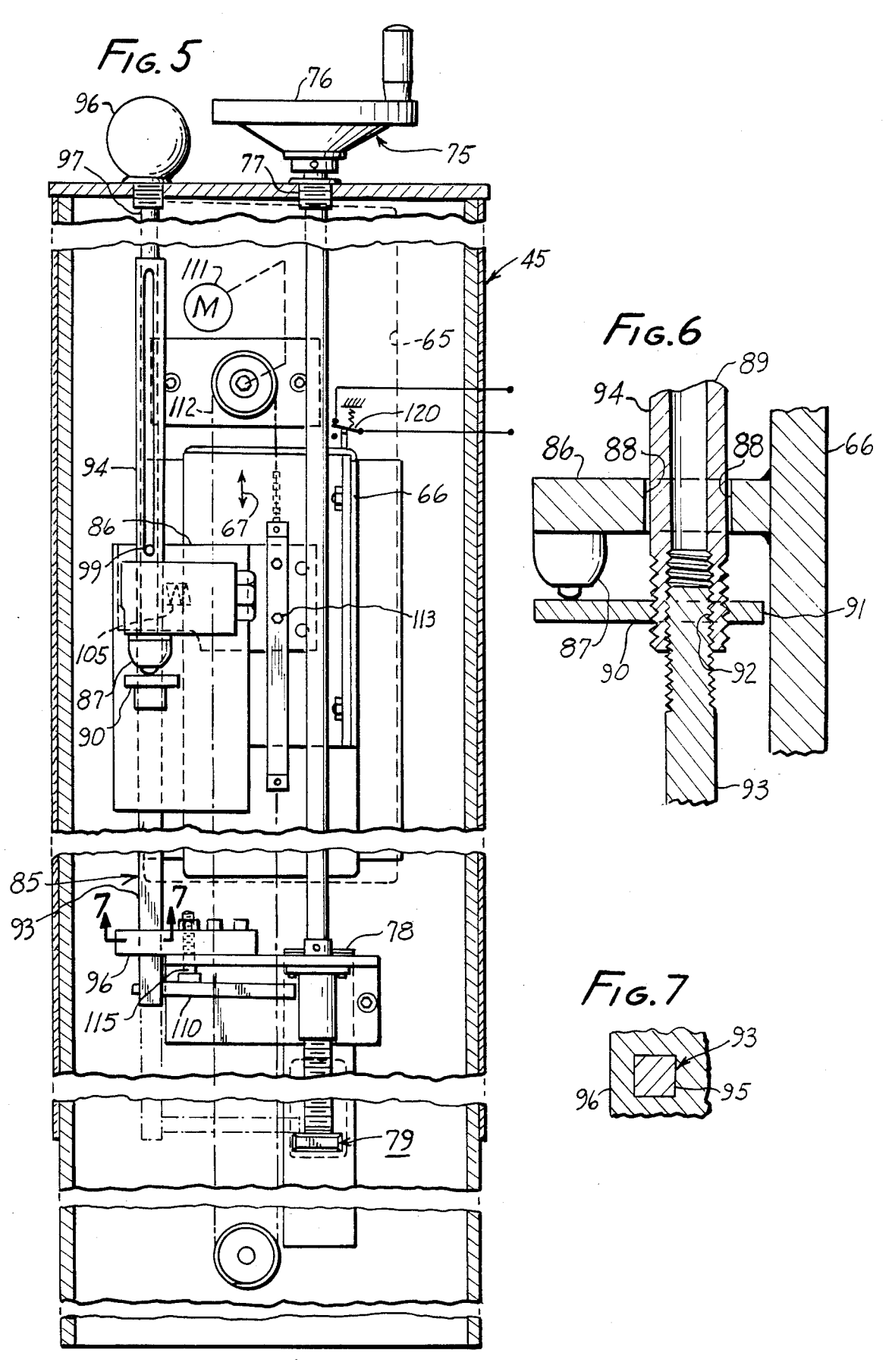

Should the machine be adapted only for a single height of pastry there need be no vertical adjustment of the head column. However, a practical machine for use in bakeries should be useful for dividing pastries of at least several heights. There is provided, as best shown in FIG. 5, a jack screw mechanism 75 having a hand wheel 76 exposed at the top to be turned by the operator. The jack screw is mounted to the head column by a grommet 77 at the top and a threaded bushing 78 near its bottom. It projects downwardly below the bearing to bear against a tongue 79 which is fixed to the frame. Turning the jack screw in bushing 78 so as to extend some of its length below the bushing causes the head column to rise, and turning it the other way will cause it to lower. The head column will be mounted to the frame by means of a vertical track engagement (not shown) which gives lateral sliding support for vertical movement of the column relative to the frame subject only to being limited by contact with the tongue 79 against farther downward movement.

The above arrangement enables the head column to be moved upwardly and downwardly as a unit, carrying the track, the blade carrier (and a blade), the supports, and the sensing means to be described, along with it. This enables the clearance to be adjusted between various heights of pastry and the support. It also enables the length of the blade stroke to be adjusted so it is shorter for pastries of lesser thickness than for pastries of greater thickness. Of course, the objective is always to stop the blade at a lower elevation adjacent to the turntable or plate. The upper elevation of the blade carrier varies according to the adjustment of the height of the head column.

Sensing means 85 is carried by carriage 66. A mounting block 86 is rigidly fixed to carriage 66. It supports a lower limit switch 87 which faces downwardly. A hole 88 through block 86 passes sensing shaft 89 for free vertical sliding motion.

A contact plate 90 has a flat surface 91 closely spaced from carriage 66 so it will not rotate. It extends beneath switch 87, and has a threaded hole 92 to which shaft 89 is threaded by a thread of one hand and selected pitch. A second portion 93 of the shaft is threaded into the upper portion 94 by a thread of same hand but of different pitch. This gives a fine adjustment to "lengthen" or "shorten" the shaft.

As best shown in FIG. 7, portion 93 has a non-circular section 95 slidably fitted in a contact plate 96. Portion 93 cannot rotate. Portion 94 can be rotated by turning ball 96 on an upper shaft portion 97, to when the ball is keyed. Portion 97 has a crosspin 99, slidable in an axial slot in portion 94. Turning the ball rotates portion 94, and because of the thread pitch differential, the effective length of the sensing shaft can finely be adjusted to account for different thicknesses of discs beneath the pastry. It gives a variability of sensing position relative to the turntable.

Also, the ball can be lifted up, to pull the entire shaft with it so as to make control contact to retract the blade at any time, as will be understood later. Its cross pin engages the upper end of the slot. This is a convenience in maintenance and cleaning, as well as providing for fast retraction any time in the sequence.

Drag means 105 is mounted to the carriage. This may be a spring-loaded friction block, which prevents axial movement of shaft portions 93 and 94, unless a strong enough force is exerted. This becomes a type of mechanical "memory" to hold the shaft in an adjusted position until the next reversal of movement. Persons skilled in the control art will recognize that other mechanical systems could be used, as well as electronic cycling systems, for sequencing and memory.

A contactor 110 extends laterally from the lower end of the shaft 93. It overhangs tongue 79. When the carriage moves downwardly to where reversal should occur, it stirkes the tongue as shown in phantom line. Continuing downward movement of the blade carriage forces the shaft upwardly relative to the carriage, and contact plate 90 contacts switch 87 to stop downward movement. Motor 111 drives the carriage through a looped chain 112 connected to the carriage by a joinder 113. Suitable connections will be made between the switches and the motor, which will be evident to persons skilled in the controls art.

Limitation on upward movement of the blade carriage is caused by actuation of limit switch 120 mounted to the frame while at the same time releasing "memorized" contact plate 90 from switch 87, which is accomplished by contactor 110 stoping against adjustable stop screw 115, and the motor will stop.

A motor 125 (FIG. 1) is mounted to carriage 36, and is linked to the turntable to turn it by an appropriate number of degrees after each separation is made. A pulse-counting stepper motor is useful because it can provide a wide range of portion sizes. However, this is merely one form of indexing means. A quite suitable alternative technique is mechanical rather than "pulse counting". An indexing plate may have holes or dowels respective to the desired number of pieces, and may rotate to a mechanical stop such as a solenoid plunger which can be released to enable the turntable to be released to rotate to the next stop. The turntable would be driven by a continuously operating motor through a slipclutch. This illustrates the wide range of suitable indexing devices.

The control logic is as follows. The pastry is loaded on the turntable with carriage 36 in its second position, away from the vertical axis. Then the carriage is shoved to its first position in alignment with the vertical axis. The two power switches are pressed and motor 111 drives the blade carriage downwardly, until the contactor 110 strikes tongue 79 and the blade carriage moves far enough relative to sensing shaft 85 to change the condition of switch 87. This stops downward movement. If desired, upward movement could be arranged independently of motor 111, but it is useful simply to reverse it at this time by an automatic sequencing operation, and upward movement will continue until contactor 110 strikes stop screw 115 to cause the shaft 89 to shift downwardly relative to the blade carriage, and limit switch 87. Upward movement continues until switch 120 is contacted. Then upward movement stops, and the turntable will be turned through its predetermined angle, and the cycle will be repeated. Preferably means which stops the turntable after the pastry is rotated 180 degrees (180°) (for a double cut) or 360 degrees (360°) (for a single-sided cut). Carriage 36 will then be released to move to its second position, conveniently by cycling circuit means.

Adjustment of the head column using jack screw 75, and of the effective length of the sensing shaft 89 will be understood from the foregoing.

All of the foregoing results in a machine which can readily and reliably insert separators into pastries of various diameters and heights at predetermined angular intervals. The device is simple and rugged in construction and is able to be cleaned in accordance with good food machinery practice.

This invention is not to be limited by the embodiments shown in the drawings and described in the description, which are given by way of example and not of limitation, but only in accordance with the scope of the appended claims.

We claim:

1. A pastry processor for forming a separation in a pastry body, and inserting a separator in said separation, comprising: a base frame; a rotary turntable mounted to said base frame adapted to rotate around a vertical axis as a center, said turntable being adapted to support a pastry for rotation therewith; a head column mounted to said base frame; a vertically extending blade track on said head column; a blade carrier mounted in said blade track for vertical movement toward and away from said turntable so as to enter and form a separation in a pastry body atop the turntable; a blade mounted to said blade carrier having an edge adapted to part the pastry body; support means for supporting a separator, said support means having a slot to pass said blade, and a support surface at each side of said slot, said surfaces receiving the separator that bridges the slot, said support means being mounted to said head column, and said blade carrier being reciprocable so as to move the blade so that said edge is selectively at an upper elevation above said slot, and at a lower elevation below said slot adjacent to said turntable; motive means adapted to drive said blade carrier selectively upwardly and downwardly to move said edge to and between said elevations; sensing means operatively linked to said blade carrier to sense proximity of said blade edge to said lower elevation; and control means responsive to said sensing means to cause said motive means to stop driving said blade toward said turntable; said sensing means comprising a depending member contactable with limit means that is vertically fixed relative to said turntable to strike said limit means and be displaced thereby relative to said blade, whereby to actuate said control means.

2. Apparatus according to claim 1 in which said control means is further effective to cause said motive means to move said blade carrier to move the blade edge toward said upper elevation.

3. Apparatus according to claim 2 in which upper limit means is effective to terminate the operation of said motive means when said blade carrier has reached a desired upper elevation.

4. Apparatus according to claim 1 in which indexing means rotates said turntable through an angular increment after withdrawal of the blade from the pastry.

5. Apparatus according to claim 1 in which said head column is vertically movable, so as to enable adjustment of the height of the support and of the track relative to said base frame, and thereby relative to said turntable.

6. Apparatus according to claim 5 in which a jack screw is disposed between said frame and said column to enable said adjustment to be made.

7. Apparatus according to claim 1 in which said turntable is mounted to said base frame through a carriage carried by a slide, said carriage moves along said slide to convey the turntable from a first position where its central axis is coincident with the blade, and to a second position where it is not, and in which the turntable is then more accessible to an operator of the processor than when in said first position.

8. Apparatus according to claim 7 in which said carriage is spring loaded toward said second position, but restrained in said first position until after a predetermined number of blade strokes has occurred.

9. Apparatus according to claim 1 in which indexing means is adapted to turn said turntable by a predetermined fraction of a total revolution after each removal of the blade from the pastry body.

10. Apparatus according to claim 1 in which said depending member is manually liftable, whereby to cause said control means to move said blade away from said turntable.

11. Apparatus according to claim 1 in which there is a pair of said support means, one on each side of the central axis of the turntable.

12. Apparatus according to claim 1 in which upper limit means limits the upper travel of said blade carrier.

13. Apparatus according to claim 1 in which said depending member is provided in two threaded-together portions, which can be rotated relative to one another, whereby to adjust its effective length.

14. A pastry processor for forming a separation in a pastry body, and inserting a separator in said separation, comprising: a base frame; a rotary turntable mounted to said base frame adapted to rotate around a vertical axis as a center, said turntable being adapted to support a pastry for rotation therewith; a head column mounted to said base frame; a vertically extended blade track on said head column; a blade carrier mounted in said blade track for vertical movement toward and away from said turntable so as to enter and form a separation in a pastry body atop the turntable; a blade mounted to said blade carrier having an edge adapted to part the pastry body; support means for supporting a separator, said support means having a slot to pass said blade, and a support surface at each side of said slot, said surfaces receiving the separator that bridges the slot, said support means being mounted to said head column, and said blade carrier being reciprocable so as to move the blade so that said edge is selectively at an upper elevation above said slot, and at a lower elevation below said slot adjacent to said turntable; and motive means adapted to drive said blade carrier selectively upwardly and downwardly to move said edge to and between said elevations; there being a pair of said support means, one on each side of the central axis of the turntable; each of said support means including a respective stop and ramp, on opposite sides of the slot, said stops and ramps being adjustable to accomodate separators of various lengths for pastries of various heights.

15. Apparatus according to claim 14 in which a supply bin is mounted to the column above each said support means to make available separators for insertion into said supports, and in which a pair of actuator switches are provided above the turntable, requiring concurrent actuation by both hands of the operator in order to cause the motive means to move the blade carrier.

* * * * *